United States Patent
Soranzo

(10) Patent No.: US 12,012,571 B2
(45) Date of Patent: Jun. 18, 2024

(54) COMPOSITION FOR INSTANT CLEANING OF CEMENT-BASED RESIDUES FROM FLOORED SURFACES

(71) Applicant: FILA INDUSTRIA CHIMICA S.P.A. IN SIGLA FILA S.P.A., San Martino di Lupari (IT)

(72) Inventor: Maria Antonia Soranzo, Montegalda (IT)

(73) Assignee: FILA INDUSTRIA CHIMICA S.P.A. IN SIGLA FILA S.P.A., San Martino di Lupari (IT)

( * ) Notice: Subject to any disclaimer, the term of this patent is extended or adjusted under 35 U.S.C. 154(b) by 513 days.

(21) Appl. No.: 17/278,348

(22) PCT Filed: Sep. 21, 2019

(86) PCT No.: PCT/IB2019/058006
§ 371 (c)(1),
(2) Date: Mar. 22, 2021

(87) PCT Pub. No.: WO2020/058946
PCT Pub. Date: Mar. 26, 2020

(65) Prior Publication Data
US 2022/0033735 A1 Feb. 3, 2022

(30) Foreign Application Priority Data
Sep. 21, 2018 (IT) .......................... 102018000008833

(51) Int. Cl.
*C11D 3/02* (2006.01)
*C11D 1/12* (2006.01)
*C11D 1/65* (2006.01)
*C11D 1/75* (2006.01)
*C11D 3/04* (2006.01)
(Continued)

(52) U.S. Cl.
CPC ................ *C11D 3/042* (2013.01); *C11D 1/12* (2013.01); *C11D 1/65* (2013.01); *C11D 1/75* (2013.01); *C11D 3/2068* (2013.01); *C11D 3/30* (2013.01); *C11D 3/349* (2013.01); *C11D 3/43* (2013.01); *C11D 1/008* (2013.01); *C11D 1/22* (2013.01); *C11D 1/62* (2013.01); *C11D 2111/14* (2024.01)

(58) Field of Classification Search
CPC .... C11D 1/12; C11D 1/62; C11D 1/75; C11D 3/042; C11D 3/2068; C11D 3/30; C11D 3/349
USPC ....... 510/214, 238, 240, 426, 427, 494, 495, 510/499, 505, 506
See application file for complete search history.

(56) References Cited

U.S. PATENT DOCUMENTS 6,281,182 B1 * 8/2001 Leonard ............. C11D 17/0021
510/432
8,193,138 B2 * 6/2012 Nekmard ............. C11D 3/2068
510/427

(Continued)

FOREIGN PATENT DOCUMENTS

CA 2235484 C 6/1996
WO 2007104921 A1 9/2007

*Primary Examiner* — Gregory R Delcotto
(74) *Attorney, Agent, or Firm* — Carmel Patent Agency; Robert Ballarini

(57) ABSTRACT

A cleaning composition for removing cement-based residues from tiles, such as cementitious grout used for installing flooring and for filling the joints is presented. The composition includes: sulfamic acid, a glycol solvent, and water.

13 Claims, 2 Drawing Sheets

(51) Int. Cl.
*C11D 3/20* (2006.01)
*C11D 3/30* (2006.01)
*C11D 3/34* (2006.01)
*C11D 3/43* (2006.01)
C11D 1/00 (2006.01)
C11D 1/22 (2006.01)
C11D 1/62 (2006.01)

(56) References Cited

U.S. PATENT DOCUMENTS

| | | |
|---|---|---|
| 8,197,605 B2 | 6/2012 | Laffitte |
| 8,383,566 B2 * | 2/2013 | Zhu ........................ C11D 3/042 |
| | | 510/505 |
| 2005/0065055 A1 * | 3/2005 | Barnes ................. C11D 3/2006 |
| | | 510/421 |

* cited by examiner (a)

(b) (c)

COMPOSITION FOR INSTANT CLEANING OF CEMENT-BASED RESIDUES FROM FLOORED SURFACES

FIELD OF THE INVENTION

The present invention relates to a cleaning composition for instantaneous removal of cementitious residues, such as, among others, cement-based stucco from ground or wall surfaces floored with tiles during the laying of the flooring.

BACKGROUND ART

As is known, the laying of a flooring on a wall or ground surface, etc. in summary consists of, first, the arrangement according to a predefined design of a set of tiles on a screed or a plastered wall, and then filling of the joints or "grout lines" between a tile and the adjacent ones with a filler or stucco.

As a result of the flooring installation, and more generally of the operations that take place in the construction site, dirt remains on the surface of the tiles and joints. Dirt is constituted by residues of the cement products used in the flooring installation (such as the adhesive to glue the tiles or the stucco used for filling the grout lines), but also from cement or lime stains, or from limestone or saltpeter efflorescence. Furthermore, in the case of floorings with large-format tiles (e.g. 120×120 cm slabs) there is a third source of dirt consisting of materials such as magnesium hydride powder applied to the lower surface of the slab to facilitate handling during the production cycle: once the slabs are stacked, the powder remain impressed on the upper surface of the slab and can attack the tile enamel.

These cement residues must be removed from the tiles and from the joints using a specific washing treatment. In fact, an untimely or inadequate cleaning of the floored surface can lead to the formation of hard-to-remove halos or cement films capable of absorbing dirt and even to irreversible alterations in the coloring of the tiles. Therefore, the cleaning/washing activity must be carried out as soon as possible at the end of the flooring installation or, ideally, during the laying operations in order to promptly remove the residues of the products used as adhesive or filler before that they can damage the tiles. The washing treatment of the flooring is carried out with a cleaning product, typically an acid-based cleaning product, and is accompanied by a mechanical action to facilitate the removal of the cement residue, for example with a sponge or a brush: This mechanical action must be carried out by the operator in an correct manner to avoid damaging the flooring itself.

In spite of this need, according to the Applicant's best knowledge, no specific products are known on the market for removing cement-based residues from tiles during flooring laying. Therefore, products having a slightly different use are currently employed for this purpose.

A first family of products of this kind consists of aqueous solutions of strong acids (generally hydrochloric acid, sulfuric acid) available on the market at different concentrations (e.g. muriatic acid). However, the use of these extremely corrosive products poses serious problems as they develop a large quantity of toxic fumes (chlorine and sulfur dioxide) which are harmful to the operator and capable to attack delicate floorings (even if substantially resistant to acids), damage the color (especially if based on oxides-based pigments), and especially oxidize the metal components present in the site where they are used. Moreover, these compounds have an even too rapid action which does not give the operator time to exert a mechanical action to facilitate the penetration of the chemically-active acid into the innermost layers of the residue. This results in a limitation of the chemical action to the outer layer of the residue that actually comes into contact with the acid. In this way, paradoxically, the excessive rapidity of chemical action of products based on strong acids does not determine an equally effective action of removing cement-based residues.

Due to these characteristics, strong acid-based cleaning compositions are obviously not suitable for cleaning the tiles during flooring installation.

Other products currently on the market for cleaning tiles have characteristics that make them not suitable for cleaning tiles and joints during laying of the flooring. First of all, their action is not instantaneous and require at least 20 minutes depending on the consistency of the residue. Unfortunately the slow cleaning action of these products is difficult to reconcile with the needs of the flooring installer. Secondly, these cleaning products must be thoroughly rinsed after they have performed their cleaning action.

Moreover, to the best knowledge of the Applicant, the products on the market are not effective for removing residues of "high-performance fillers/sealants", i.e. cement-based fillers/sealants admixed with organic resins (typically acrylic resins or other) used for filling joints in those applications where elasticity and hydrophobicity of the grouting lines must be ensured. These high-performance filler/sealant materials for joints, which in jargon are called "polymer-modified fillers/sealants", "hybrid fillers/sealants" or "additive-based joints/sealants" can be considered the evolution of cement-based joints/sealants and include organic additives that make the material more flexible, water-repellent and anti-mold, but at the same time make it more tenacious to remove. For the sake of clarity, in the present patent specification such fillers/sealants are named "polymer-modified fillers".

A research in the known art has highlighted the Canadian patent CA2235484C. Although it describes cleaning and bactericidal compositions, they are intended for a different technical field/use. In fact, CA2235484C discloses compositions for removing foam residues of soaps and limestone stains from surfaces, in particular from the surface of sanitary ware, but it is silent about removal of cement residues.

Said compositions comprise citric acid and another acid selected from tartaric acid, lactic or glycolic acid and a mixture of hydrophobic solvents and hydrophilic solvents. In particular, this application describes several long lists of organic acids, lists of hydrophobic solvents, such as white spirit and many ethereal solvents and, finally, lists of hydrophilic solvents such as alcohols, glycols, acetates, ethers acetates and glycolic ethers. The examples provided show the cleaning effect of specific mixtures including citric acid and another acid selected from tartaric acid, lactic or glycolic acid for the removal of limestone residues.

This composition is specifically formulated for removal of calcareous residues from hard surfaces, such as ceramic sanitary ware but it is poorly effective, or completely ineffective, for removing cement residues from tiles.

In conclusion, it is highly desirable to have a cleaning product capable of instantaneously removing cement residues from a floored surface, in particular from tiles and/or grout lines during the laying operation, as it would speed up the work of the flooring installer and avoid disputes in the event of damage to the flooring due to untimely, improper or still lack of washing the after installation.

In particular, it is also desirable that, in addition to removing cement residues during the flooring laying, the cleaning product is able to remove residues of polymer-modified fillers as described above.

Object of the Invention

The present invention intends to fully overcome the limits of the cleaning compositions known to the state of the art, by providing an improved solution to the problem of removing cement-based residues from floored surfaces, in particular floored with tiles.

Therefore, the first and main object of the present invention is to provide a cleaning composition suitable for removing residues from surfaces floored with ceramic tiles, porcelain stoneware, clinker, glass mosaic or other acid-resistant flooring materials. More precisely, these residues refer to cement-based products used in the laying phase of the floor or wall surfaces such as adhesives for the tiles or fillers for grouting the joints. Said fillers may possibly be modified with acrylic or other types of resins (i.e. polymer-modified fillers). Furthermore, it would be desirable for the cleaning composition to also remove the residues of glue used to stick the tiles to the screed.

A second important object of the present invention is to provide an instantaneous or fast-acting cleaning composition which, unlike conventional products, can be used during the laying of the flooring and not only at the end of such operation. In particular, this scope includes the development of a composition which comprises the following features: first, it performs its cleaning action as soon as it comes into contact with the residue; second, it has reaction times compatible with a concomitant action of mechanical removal of the residue; third, it dries quickly; and finally does not produce foam or leave residues adhered to the surface during application and hence does not require rinsing.

In addition, a third important object is to provide a ready-to-use cleaning composition, in liquid or gel form, which can be easily applied by spraying or by means of a spatula, or other suitable tool, by a professional installer or by a skilled hobbyist.

Furthermore, a fourth important object of the present invention is to provide a safe cleaning composition whose application does not release, or releases modestly, toxic fumes and can be handled with individual protection devices compatible with the activity of the professional and non-professional installer.

Consistent with the aforementioned tasks, another main object of the present invention is to disclose a novel method based on said cleaning composition useful for removing from tiles residues of products used during flooring laying. Contrary to cleaning and washing procedures based on products of known type, said novel method can be carried out simultaneously with flooring laying and not only at the end of flooring installation.

Finally, a last purpose of the present invention is providing a cleaning composition and describing a cleaning method that can be implemented at low costs with known technologies. These and other objects, which more clearly will appear below, are achieved by a cleaning composition defined in the appended set of claims. The aforementioned claims, to which reference should be made for the sake of brevity, and are intended as an integral part of the present description.

Further characteristics and advantages of the invention will become better apparent from the description and from the embodiments of the invention, herein provided for the purpose of exemplifying and not limiting the invention.

DESCRIPTION OF DRAWINGS

Other features and advantages will become clearer to the person skilled in the art from the accompanying images, given herein as a non-limiting example of the present invention, in which.

DESCRIPTION OF THE INVENTION

Figure 1:
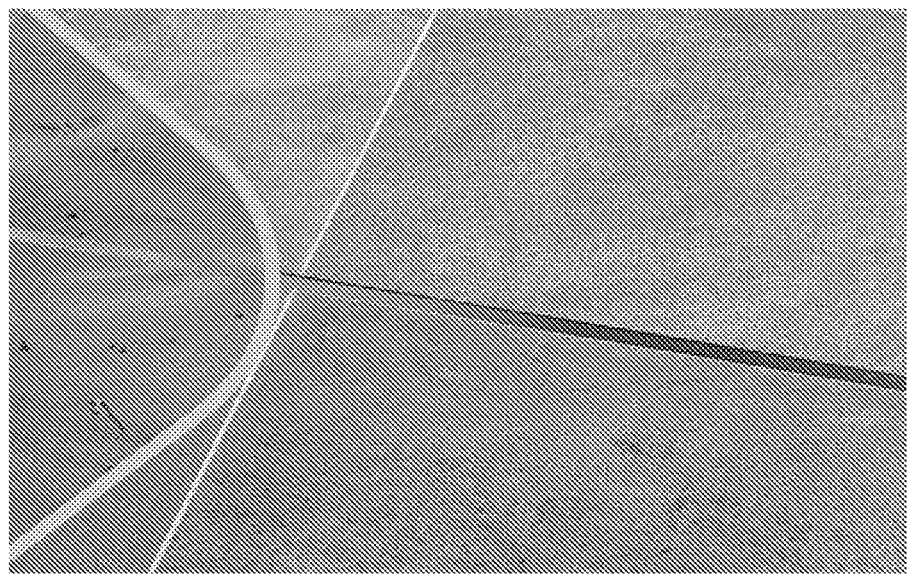
FIG. 1 illustrates the effect of the cleaning composition according to the preferred embodiment of the invention on a surface floored with porcelain stoneware. In particular, in the left part of the photograph it is evident the presence of cementitious residues (in the form of lumps or a patina) adhering to the surface, and the greyish hue of the surface always due to the presence of cement residues. On the contrary, on the right side of the photograph, the same surface appears perfectly clean and completely free of cement residues of any kind.

The present invention relates to a cleaning composition for removing cement-based residues from tiles, such as cementitious grout used for laying the flooring and for filling the joints. Said composition is characterized, among other things, by the rapidity of action and the high cleaning efficiency and is thus suitable for use during flooring laying, and not only after flooring installation.

Therefore, it is an object of the present invention to provide a cleaning composition comprising:
sulfamic acid,
a glycol solvent,
water.

It has in fact been surprisingly found that the combination between the sulfamic acid and a solvent glycol, or glycol-solvent, exhibits a very high effectiveness in the removal of cement-based residues. In fact, sulfamic acid, in the absence of glycolic solvents shows much lower efficacy and requires longer times to remove cementitious residues and, in addition, it is not effective in removing cementitious residues admixed with organic resins. Moreover, given the increased efficacy, due to the combination of sulfamic acid and the glycol-solvent, the cleaning composition can conveniently contain small amounts of sulfamic acid. As a consequence of the reduction of the sulfamic acid content, the acid aggressiveness of the composition towards the tiles is reduced and safety for the installator handling the product is increased.

In particular, among the glycol solvents, the composition which in combination with sulfamic acid has provided the best results in the removal of cement residues is 1-propoxy-2-propanol. Therefore 1-propoxy-2-propanol is the preferred glycol solvent.

It is another object of the present invention the use of the cleaning composition comprising sulfamic acid, a glycol solvent and water for removing cementitious residues.

Finally, it is a further object of the present invention a method based on said cleaning composition for removing cementitious residues from a flooring installed on a surface.

DETAILED DESCRIPTION OF THE INVENTION

It is an object the present invention is a cleaning composition suitable for removing cement residues from a floored surfaces, in particular from tiled surfaces, i.e. from a flooring in the form of a plurality of tiles.

Therefore, the object of the present invention is a cleaning composition comprising:
  sulfamic acid,
  a glycol solvent,
  water.

As already stated above, this combination is extremely effective in removing cement residues and it also provides a high-rate of removal of the same.

In this regard, it should be noted that the term "cementitious residues" includes adhesives, fillers, cement-based fillers, hybrid cement/organic fillers i.e. polymer-modified fillers, magnesium hydride powders, etc. The flooring, and in particular, the tiled surfaces comprise tiles which can be made of porcelain stoneware, ceramic, terracotta, glass mosaic, klinker, stone or other acid-resistant flooring material, or a combination thereof.

Sulfamic acid, also called sulfamide acid or amidosulfonic acid, is a monoprotic acid with chemical formula $H_2NSO_3H$, and more precisely $H_2N-SO_3H$. It is identified with CAS Registry Number 5329-14-6. This compound is widely commercially available and at room temperature appears as a white solid.

The term solvent glycol therefore comprises alkyl glycol solvents and heteroglycol solvents, and among these, in particular, 1,2-propylene glycol, 1,3-propylene glycol, ethylene glycol, diethylene glycol, 1-propoxy-2-propanol, polyethylene glycol and polypropylene glycol.

According to a preferred embodiment the solvent glycol is selected from 1-propoxy-2-propanol, ethylene glycol, 1,2-propylene glycol, 1,3-propylene glycol and diethylene glycol.

According to a more preferred embodiment the solvent glycol is 1-propoxy-2-propanol; said compound has the following chemical formula $CH_3(CH_2)_2OCH_2CH(CH_3)OH$ and is a widely commercially available substance. This glycol solvent is in fact the one that has provided the best results in terms of removal of cement residues.

Therefore, according to a more preferred embodiment, the preferred cleaning composition comprises sulfamic acid, 1-propoxy-2-propanol and water.

According to a preferred embodiment, the percentage of sulfamic acid in said composition is conveniently maintained to the minimum possible value which ensures an effective cleaning action and avoids the formation of noxious compounds especially sulfur dioxide. Advantageously, it is preferred a weight percentage of sulfamic acid greater than or equal to 0.5% by weight, (i.e. weight over weight or w/w), and less than 10% by weight. In fact, the present composition has demonstrated an unexpected ability to remove cement residues even with a weight percentage of 0.5% by weight of sulphamic acid and performs very well already with 1% by weight of sulphamic acid.

Therefore, according to a preferred embodiment, the cleaning composition comprises:
  sulphamic acid in a quantity comprised between 0.5% and 10% by weight,
  a glycol solvent in a quantity ranging from 0.5% to 30% by weight,
  water in a quantity ranging from 60% to 99.0% by weight.

By weight we mean the weight of the ingredient with respect to the overall weight of the cleaning composition. For example, a cleaning composition comprising 10% sulphamic acid means that it contains 10 grams of sulfamic acid per 100 grams of composition.

According to a more preferred embodiment, the cleaning composition comprises:
  sulphamic acid in a quantity comprised between 0.5% and 10% by weight,
  a glycol solvent in a quantity ranging from 0.5% to 20% by weight,
  water in a quantity ranging from 70% to 99.0% by weight.

According to an even more preferred embodiment, the cleaning composition comprises:
  sulphamic acid in a quantity comprised between 1% and 5% by weight,
  a glycol solvent in a quantity ranging from 1% to 10% by weight,
  water in a quantity ranging from 85% to 98% by weight.

According to a further preferred embodiment, the cleaning composition comprises:
  sulphamic acid in a quantity comprised between 2% and 4% by weight,
  a glycol solvent in a quantity ranging from 2% to 8% by weight,
  water in a quantity ranging from 88% to 96% by weight.

According to an even further preferred embodiment, in the four preferred compositions described above, the solvent glycol is 1-propoxy-2-propanol.

The cleaning composition can comprise further ingredients, as specified below. However, according to a preferred embodiment, the composition can also be constituted only by sulfamide acid, glycol solvent and water.

Therefore, according to a preferred embodiment, the cleaning composition is a ternary composition consisting of:
  sulfamic acid,
  a glycol solvent, and
  water.

According to a more preferred embodiment, the cleaning composition is a ternary composition consisting of:
  sulfamic acid,
  1-propoxy-2-propanol, and
  water.

According to a more preferred embodiment, the cleaning composition is a ternary composition consisting of:
  sulphamic acid in a quantity comprised between 0.5% and 10% by weight,
  a glycol solvent in a quantity ranging from 0.5% to 30% by weight,
  water in a quantity ranging from 60% to 99.0% by weight.

According to an even more preferred embodiment, the cleaning composition is a ternary composition consisting of:
  sulphamic acid in a quantity comprised between 0.5% and 10% by weight,
  a glycol solvent in a quantity ranging from 0.5% to 20% by weight,
  water in a quantity ranging from 70% to 99.0% by weight.

According to a further preferred embodiment, the cleaning composition is a ternary composition consisting of:
  sulphamic acid in a quantity comprised between 1% and 5% by weight,
  a glycol solvent in a quantity ranging from 1% to 10% by weight,
  water in a quantity ranging from 85% to 98% by weight.

According to an even further preferred embodiment, the cleaning composition is a ternary composition consisting of:

sulphamic acid in a quantity comprised between 2% and 4% by weight, a glycol solvent in a quantity ranging from 2% to 8% by weight, water in a quantity ranging from 88% to 96% by weight.

According to an even more preferred embodiment, in last four preferred ternary compositions described above, the solvent glycol is 1-propoxy-2-propanol.

The ratio between the weight between the solvent glycol and the sulfamic acid constituting the mixture can preferably be between 0.5 and 3.0, in other words for 1 gram of sulfamic acid, an amount from 0.5 to 3.0 grams of solvent glycol can be used.

According to a more preferred embodiment, the weight ratio between solvent glycol and sulfamic acid is between 1.0 and 2.0.

According to an even more preferred embodiment, the weight ratio between solvent glycol and sulfamic acid is between 1.2 and 1.8; this ratio is the one that provides the best cleaning efficiency of the mixture.

According to a further preferred embodiment, in the four cleaning compositions described above, in which the ratio between solvent glycol and sulfamic acid is explicited, the solvent glycol is 1-propoxy-2-propanol.

As stated above, the described cleaning composition can optionally and further comprise additives, perfumes, gelling agents, thickeners, solvents, inert fillers, for example nano-quartz, or a combination thereof.

For example, according to an alternative embodiment the cleaning composition is in gel form and consists of:

sulphamic acid in a quantity comprised between 0.5% and 10% by weight, a glycol solvent in a quantity comprised between 0.5% and 20% by weight, one or more surfactants in a quantity ranging from 0.2% to 10% by weight, a viscosity regulator in a quantity between 0.5% and 10% by weight, water in a quantity ranging from 50% to 98.3% by weight, According to a further embodiment of said alternative embodiment, the cleaning composition in gel form consists of:

sulphamic acid in a quantity comprised between 0.5% and 10% by weight, 1-propoxy-2-propanol in an amount comprised between 0.5% and 20% by weight, cetrimonium chloride in an amount between 0.1% and 4% by weight, sodium cumene sulphonate in a quantity ranging from 0.5% to 10% by weight, polymethylene (2) oleylamine in a quantity ranging from 0.1% to 6% by weight, water in a quantity ranging from 50% to 98.3% by weight.

Cetrimonium chloride, or cetyltrimethylammonium chloride (CTAC) is a surfactant with chemical formula $C_{19}H_{42}ClN$ and identified with CAS 112-02-7. This compound is widely commercially available.

Sodium cumene sulphonate is a surfactant with the chemical formula $C_9H_{11}NaO_3S$ and identified with CAS 28348-53-0. This compound is widely commercially available.

Polymethylene (2)oleylamine (polyoxyethylene (2)oleyl amine) is a viscosity regulator with chemical formula $C_{22}H_{45}NO_4$ and identified with CAS 26635-93-8. This compound is widely commercially available.

According to a further embodiment of said alternative embodiment, the cleaning composition in gel form consists of:

sulphamic acid in a quantity ranging from 1% to 8% by weight, 1-propoxy-2-propanol in an amount comprised between 1% and 10% by weight, polymethylene (2)oleylamine in a quantity comprised between 0.5% and 4% by weight, Cetrimonium chloride in a quantity ranging from 0.2% to 2% by weight, sodium cumene sulphonate in a quantity between 0.5% and 5% by weight, water in a quantity ranging from 71% to 96.8% by weight.

This composition is in the form of a gel due to the presence of the surface-active compounds and the viscosity regulator.

The cleaning composition according to the present invention has an acid pH, typically between 1.0 and 3.0, preferably between 1.2 and 1.8.

The amount of water used modulates the viscosity of the cleaning composition in liquid or semi-solid form, for example in gel form.

As stated above, it is another object of the present invention the use of the cleaning composition described above for removing cement residues from a flooring installed on a surface.

According to a preferred embodiment, the use of a cleaning composition in which the solvent glycol is 1-propoxy-2-propanol is preferred. In particular, the use of the cleaning composition wherein the removal of cementitious residues can be performed during, and not only after, the laying of a flooring is particularly preferred.

According to a preferred embodiment, the cleaning composition is used for cleaning a flooring which consists of a plurality of tiles and a plurality of joints filled with a filling material.

Finally, according to a preferred embodiment, the use of the cleaning composition is preferred when the filling material is admixed with resins.

As stated above it is a further object of the present invention a method for removing cement residues from a flooring installed on a surface, comprising the following steps:

a) eliminate excess cement residues from the surface of a flooring;

b) applying the cleaning composition described above to said surface of the flooring;

c) waiting between 1 and 4 minutes for the composition cleaning action;

d) removing said cement residues detached from the surface;

e) optionally, repeat steps from b) to d).

According to a preferred embodiment, the method can be carried out to remove cement-based residues during the laying of the flooring.

According to a further preferred embodiment, during step d) said method provides that said residues are removed by sponging with a water impregnated sponge or a wet float sponge.

The cleaning composition of the invention can be in liquid form or in solid or semi-solid form, for example in gel form. In the latter case the composition may comprise, for example, quartzites.

According to a preferred embodiment, the composition is in liquid form, i.e. it presents as a liquid. The formulation herein disclosed is stable, ready to use. The formulation sprayed on ceramic surfaces dirty by cementitious residues, has shown an unexpected and extraordinary cleaning ability despite the fact that the percentage of acid is limited and it is much lower than conventional cleaning products.

Advantageously, the water-soluble glycol solvent fraction accelerates drying of the floored surface. This represents a remarkable advantage with respect to the sponging with water alone which the installer performs to remove from the floored surface cementitious residues after the traditional grouting of the joints, not being able, for the reasons explained above, to use during the flooring installation specific cleaning products.

Technical tests have allowed us to develop a formulation capable of acting quickly during, and not after, the flooring installation. By means of the formulation according to the present invention, it is no longer necessary to wait for the cement grout to be dried, which lengthens the washing operations, or worse, which forces to skip the fundamental washing operation of the flooring after installation.

Without any limitation on the present invention, the Applicant believes that this effect on cement residues can be the result of a synergistic action of the acid and the solvent glycol.

EXPERIMENTAL PART

Example 1: Preparation of the Cleaning Composition 900 ml of water were introduced in a 2000 mL 4 neck laboratory flask equipped with a thermometer, stirrer and heating/cooling system, and 30 g of sulphamic acid were slowly added with stirring, maintaining the mixture at room temperature. The suspension was stirred at room temperature until complete dissolution of the sulfamic acid. 45 g of 1-propoxy-2-propanol were then slowly added and the mixture was mixed until complete homogenization. The solution thus obtained was then poured and packaged in a suitable container of plastic material.

Example 2: Preparation of the Cleaning Composition 950 ml of water were introduced into a 2000 mL 4-neck laboratory flask equipped with a thermometer, stirrer and heating/cooling system, and 20 g of sulphamic acid were slowly added under stirring, maintaining the mixture at room temperature. The suspension was stirred at room temperature until complete dissolution of the sulfamic acid. 30 g of 1-propoxy-2-propanol were then slowly added and the mixture was mixed until complete homogenization. The solution thus obtained was then poured and packaged in a suitable container of plastic material.

Example 3: Testing of the Cleaning Performance

The compositions of examples 1 and 2, have been tested to verify the cleaning performance and rapidity of action. For this purpose, a protocol has been developed that tries to simulate the real conditions of use of the cleaning composition. In summary, this protocol comprises the following steps:
i. Cover a panel with commercially available natural porcelain tiles, leaving a 10 mm grout line between a tile and the adjacent one;
ii. Select a high-performance commercially available grouting material for filling joints suitable for said flooring;
iii. Following the techniques used by the installer, fill the joints with plenty of grouting material, so as to leave residues of grouting material on the tiles;
iv. Wait for a predetermined time, not less than 10 minutes, so as to allow said grouting material to adhere to the flooring;
v. Apply the composition according to the present invention to said tiles and remove the residues using the method which will be described below;
vi. Evaluate the cleaning efficacy verifying if after cleaning cementitious residues are still adhered and visible to the naked eye or by optical microscope;
vii. Evaluate the drying time of said tiles by measuring the residual humidity using a known hygrometer.

With reference to the first step, the effectiveness of the cleaning composition by means of this protocol is generally tested on surfaces floored with matt/natural or white porcelain stoneware, as they represent "critical" materials on which the cement residues tend to adhere tenaciously and therefore are more difficult to remove.

With reference to the second step of the protocol, always with the aim of evaluating the performance of the cleaning composition in critical conditions, high performance stuccos are used which are able to adhere strongly to the surface of the flooring. Among the commercially available fillers of this type, the Applicant has used materials that are widespread in the market such as Mapei Ultracolor® (registered trademark of Mapei Spa), a high-performance mortar modified with anti-efflorescence and anti-mold polymers for grouting joints from 2 to 20 mm, or Keracolor® (registered trademark of Mapei Spa), a cement-based grouting material with added polymers for grouting joints from 4 to 15 mm.

By applying this protocol, the compositions of Examples 1 and 2 have been tested both on wet surfaces, i.e. when grouting the joints, and on dry surfaces, i.e. after flooring laying has been completed (grouting 24/48 hours before). In both cases, excellent results have been obtained in terms of cleaning performance as shown in the accompanying FIG. 1.

These tests were carried out on surfaces covered with tiles having different types of finishing: natural, structured, lapped, polished and with different states of maturation of the grouting material (from 24 hours to a few weeks). Furthermore, the same tests were carried out only in some points of the grouting without finding, once dried, differences both in consistency and in the color of the flooring or joint color. Although all the tests were performed without final rinsing, residual halo of any kind were not founded.

From the results provided it is clear that the aims of the present invention have been fully achieved.

Example 4: Cleaning Method

The compositions of Examples 1 and 2 were applied to a surface floored with stoneware tiles dirty by cementitious residues, in particular dirty by grouting materials used, as mentioned, to fill the joints.

Following experimentation carried out by the Applicant in numerous conditions, the cleaning method developed is as follows. First, the excess grout is removed from the tile surface by means, for example, of a spatula. Subsequently the composition of the preferred embodiment is applied, preferably in a homogeneous manner, when the filler thickens and becomes opaque (generally from 10 to 30 minutes from the application according to the composition of the grouting material).

Conveniently said cleaning composition is applied on the surface as such, i.e. without dilution of any kind, preferably by means of a spray bottle.

However, methods other than spraying could be equivalently used, for example by means of a cloth impregnated with the cleaning composition. As a further step, said composition is left to act for 1 to 4 minutes, preferably from 1 to 2 minutes, until at least partial separation of said residues from said flooring is achieved.

During this step, whose duration depends on the degree of absorption of the material, the composition performs its cleaning action. At the end of this step, the cementitious residues detached from the surface can be easily removed, for example by means of a damp non-abrasive sponge without exerting strong pressure to avoid damaging the grout lines. The non-abrasive sponge is frequently rinsed to keep it clean. For example, it is possible to carry out this step of removing the detached cement residues by using a float sponge. In the case the cleaning composition is in form of a gel it is also possible to use dry or moistened paper.

By exerting a gentle mechanical action, two benefits are achieved. First, the already detached cement residues are removed, and then the mechanical action facilitates the penetration of the cleaning composition into the more internal layers of the cementitious residue, so that the cleaning performance is increased. Optionally, especially in the case of hard-to-remove cementitious residues, it is possible to repeat the application of the composition according to the steps described above, preferably after 1 hour from joints grouting.

Figure 2:
FIG. 2 illustrates (a) the application on a ceramic flooring of the cleaning composition according to the invention by means of a spray dispenser; (b), ceramic tiles of a floored surface affected by cement residues (Ultracolor® by Mapei Spa); (c), the same surface after the application of said cleaning composition and the removal of detached residues with a wet float sponge according to the cleaning method disclosed in this specification.
Figure 2:
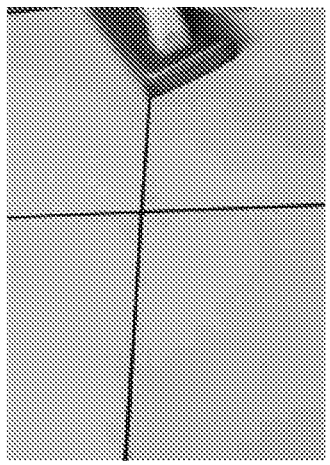
Figure 2:
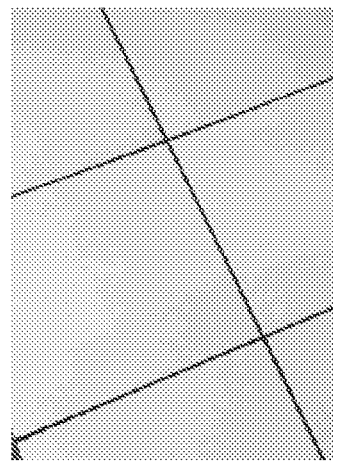

The cleaning method described herein, and schematically illustrated in the accompanying FIGS. 2(a) and 2(b), has proved effective for removing stucco residues even from critical floorings, for example from porcelain stoneware floorings on which cement-based filler tends to adhere tenaciously. Moreover, process steps and times of action are substantially the same even if the cement-based filler is admixed with resin. Similarly, residues of the material used to glue the tiles can also be removed from the covered surface, provided that these have a substantially cement-based composition.

The cleaning method described above has numerous advantages. First of all, thanks to the innovative characteristics of the cleaning composition according to the present invention, it does not damage the grout lines nor the aluminum and steel profiles contrary to known cleaning products. In addition, the method can be used on both floor or wall surfaces, Furthermore, in outdoor applications but also in indoor spaces as the cleaning composition does not emit toxic fumes in dangerous amount. In this way, the cleaning method does not require the operator to use particular and bulky personal protection devices. Thirdly, the cleaning process does not require a rinsing step since the cleaning composition does not produce foam. Finally, the process allows to achieve a high yield thanks to the unexpected cleaning efficiency of the composition according to the present invention (with 750 ml of product it is possible to treat up to 350 linear meters of large-format tiles and up to 15 $m^2$ of fine mosaic).

From the description provided herein it is apparent that the cleaning method can be carried out simultaneously with flooring laying and finishing as the application times are completely compatible with this latter activity. In particular, this method achieves a reduction in cost and time as it can be advantageously performed by the same operator who lays and finishes the flooring. In fact, in many construction sites cleaning of the floored surfaces is generally carried out by workers other than the flooring installer (in any case, using non-specific cleaning products as mentioned before). Finally, the process described here has also proved effective for cleaning the back surface of large slabs before laying as well as for cleaning the filling tools after use.

The success of this cleaning process is based on the extraordinary instantaneous cleaning performance of the cleaning composition of the invention.

Example 5: Further Testings of the Cleaning Performance

As a further non-limitative example of the present invention, four liquid/gel formulations of cleaning composition were prepared. The preparation route was substantially the same of Example 1 and 2. With reference to Table 1 and Table 2, said formulations were named Product 1,4,5 and 10. Cleaning performance of said formulations were evaluated by using the protocol of Example 3, in particular by checking whether or not visible (to the naked eye and by optical microscope) cement-based residues still remain on the flooring surface after a predetermined cleaning time (i.e. action time of the cleaning formulations). For each formulation performance 3 tests were performed under the same experimental conditions: temperature (25° C.); cleaning formulation quantity (50 ml); flooring material (porcelain stoneware); means of application (brush) and conditions (substantially same pressure); product residence time on the surface (5 min, 10 min and 12 min); means for removing concrete-based residues (slightly-abrasive sponge) and conditions (substantially same pressure).

TABLE 1

Formulations of the cleaning composition in liquid form

| Product | Composition | Removal after 5 min | Removal after 10 min | Removal after 12 min |
| --- | --- | --- | --- | --- |
| Product 4 | sulfamic acid in a quantity between 0.5% and 10% by weight; 1-propoxy-2-propanol in a quantity between 0.5% and 30% by weight; water in a quantity ranging between 60% and 99.0% by weight. | No visible residue | No visible residue | No visible residue |

TABLE 1-continued

Formulations of the cleaning composition in liquid form

| Product | Composition | Removal after 5 min | Removal after 10 min | Removal after 12 min |
|---------|-------------|---------------------|----------------------|----------------------|
| Product 5 | sulfamic acid in a quantity between 1% and 5% by weight; 1-propoxy-2-propanol in a quantity between 1% and 10% by weight; water in quantities between 85% and 98% by weight. | No visible residue | No visible residue | No visible residue |
| Product 10 | sulfamic acid in a quantity between 0.5% and 10% by weight; 1-propoxy-2-propanol in a quantity between 0.5% and 30% by weight; water in a quantity between 60% and 99.0% by weight. | No visible residue | No visible residue | No visible residue |

TABLE 2

Formulations of the cleaning composition in gel form

| Product | Composition | Removal after 5 min | Removal after 10 min | Removal after 12 min |
|---------|-------------|---------------------|----------------------|----------------------|
| Product 1 | sulfamic acid in a quantity between 0.5% and 10% by weight; 1-propoxy-2-propanol in a quantity between 0.5% and 20% by weight; one or more surfactants in a quantity between 0.2% and 10% by weight; a viscosity regulator in a quantity between 0.5% and 10% by weight; water in a quantity between 50% and 98.3% by weight. | No visible residue | No visible residue | No visible residue |

What is claimed:

1. A cleaning composition, wherein said composition is a ternary composition consisting of:
   sulfamic acid,
   a glycol solvent, and
   water.

2. The cleaning composition according to claim 1, wherein the glycol solvent is selected from the group consisting of: 1-propoxy-2-propanol, ethylene glycol, 1,2-propylene glycol, 1,3-propylene glycol and diethylene glycol.

3. The cleaning composition according to claim 1, wherein the glycol solvent is 1-propoxy-2-propanol.

4. The cleaning composition according to claim 1, wherein said composition consists of:
   sulfamic acid in an amount between 0.5% and 10% by weight,
   a glycol solvent in an amount between 0.5% and 30% by weight,
   water in an amount between 60% and 99.0% by weight.

5. The cleaning composition according to claim 4, wherein said composition consists of:
   sulfamic acid in an amount ranging from 1% to 5% by weight,
   a glycol solvent in an amount between 1% and 10% by weight,
   water in an amount between 85% and 98% by weight.

6. The cleaning composition according to claim 1, wherein the weight ratio of glycol solvent to sulfamic acid is between 1.0 and 2.0.

7. The cleaning composition according to claim 4, wherein the glycol solvent is 1-propoxy-2-propanol.

8. A cleaning composition consisting of:
   sulfamic acid in an amount between 0.5% and 10% by weight,
   1-propoxy-2-propanol in an amount between 0.5% and 20% by weight,
   cetrimony chloride in an amount between 0.1% and 4% by weight,
   sodium cumene sulphonate in a quantity between 0.5% and 10% by weight,
   polyimethylene (2) oleylamine in an amount between 0.1% and 6% by weight, and
   water in an amount between 50% and 98.3% by weight.

9. Process for the removal of cementitious residues from a flooring installed on a substrate, said process comprising:
   a. eliminating the excess of cementitious residues from the surface of a flooring;
   b. applying on said surface of a flooring a cleaning composition according to claim 1;
   c. allowing said composition to act for between 1 and 4 minutes;
   d. removing said cementitious residues detached from said surface;
   e. repeating steps b to d if necessary.

10. The process according to claim 9, wherein said flooring consists of a plurality of tiles and a plurality of grout lines filled with grouting material.

11. The process according to claim 10, wherein said filling material is admixed with resins.

12. The process according to claim 9, wherein said process is performed during installation of said flooring.

13. The process according to claim 9, wherein the removal of said residues during step d is performed by water-sponging with a sponge or a sponge plastering trowel impregnated with water.

\* \* \* \* \*